United States Patent [19]
Gonzales et al.

[11] Patent Number: 6,078,286
[45] Date of Patent: Jun. 20, 2000

[54] METHOD AND APPARATUS FOR EFFICIENT ACQUISITION AND TRACKING OF SATELLITES

[75] Inventors: Estevan Marcial Gonzales, Tempe; Richard Alan Bienz, Chandler, both of Ariz.

[73] Assignee: Motorola, Inc., Schaumburg, Ill.

[21] Appl. No.: 09/089,895

[22] Filed: Jun. 3, 1998

[51] Int. Cl.[7] ..................................................... H01Q 3/00
[52] U.S. Cl. ................ 342/359; 342/357.06; 342/357.15
[58] Field of Search ..................... 342/357.01, 357.06, 342/357.1, 357.15, 76, 359, 422, 428

[56] References Cited

U.S. PATENT DOCUMENTS

| | | | |
|---|---|---|---|
| 5,187,805 | 2/1993 | Bertiger et al. | 455/12.1 |
| 5,621,646 | 4/1997 | Enge et al. | 364/449 |
| 5,999,125 | 12/1999 | Kurby | 342/357.1 |

*Primary Examiner*—Thomas H. Tarcza
*Assistant Examiner*—Dao L. Phan
*Attorney, Agent, or Firm*—Dana B. LeMoine; Bradley J. Botsch

[57] ABSTRACT

A method and apparatus for efficiently tracking satellites includes a geosynchronous satellite (10) for transmitting the ephemeris of non-geosynchronous satellites (20, 30) to a ground terminal (50). The ephemeris is computed by the non-geosynchronous satellites (20, 30) or by other means such as a ground station (60). A ground terminal (50) can quickly acquire a non-geosynchronous satellite (20, 30) by receiving fresh ephemeris data from a geosynchronous satellite (10), determining a location of a non-geosynchronous satellite (20, 30), and orienting an antenna.

5 Claims, 4 Drawing Sheets

METHOD AND APPARATUS FOR EFFICIENT ACQUISITION AND TRACKING OF SATELLITES

FIELD OF THE INVENTION

This invention relates in general to satellite systems and, in particular, to the acquisition and tracking of satellites within satellite systems.

BACKGROUND OF THE INVENTION

Ground terminals are in widespread use in satellite communications systems today. When ground terminals are installed, they are turned on and acquire satellite signals. When the satellites are geosynchronous satellites, such as television broadcast satellites in common use today, acquiring satellite signals at turn-on is not a difficult problem. Geosynchronous satellites appear stationary relative to a fixed point on earth, and so it is relatively simple to point a ground terminal antenna to acquire a geosynchronous satellite signal.

Non-geosynchronous satellites present a different situation. Because non-geosynchronous satellites move relative to a fixed point on earth, a ground terminal installer cannot simply point a ground terminal antenna to a fixed location in space and expect the ground terminal to acquire a non-geosynchronous satellite signal. Instead, information regarding the satellite's location as a function of time is needed so that the ground terminal can locate the non-geosynchronous satellite, and acquire its signal.

Historically, ground terminals have been pre-programmed at the factory with information describing the satellite's orbit. Unfortunately, this information can be become old, or "stale," because the orbits of non-geosynchronous satellites can regularly change as a result of orbit degradation and adjustment. The result is that, when ground terminals are turned on, they spend time searching the sky for non-geosynchronous satellites. Since it is desirable to increase the time spent providing services and generating revenue, it would be advantageous to minimize time spent by ground terminals searching for non-geosynchronous satellites.

Accordingly, a need exists for a method and apparatus for efficiently acquiring and tracking non-geosynchronous satellites.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE DRAWINGS

Figure 1:
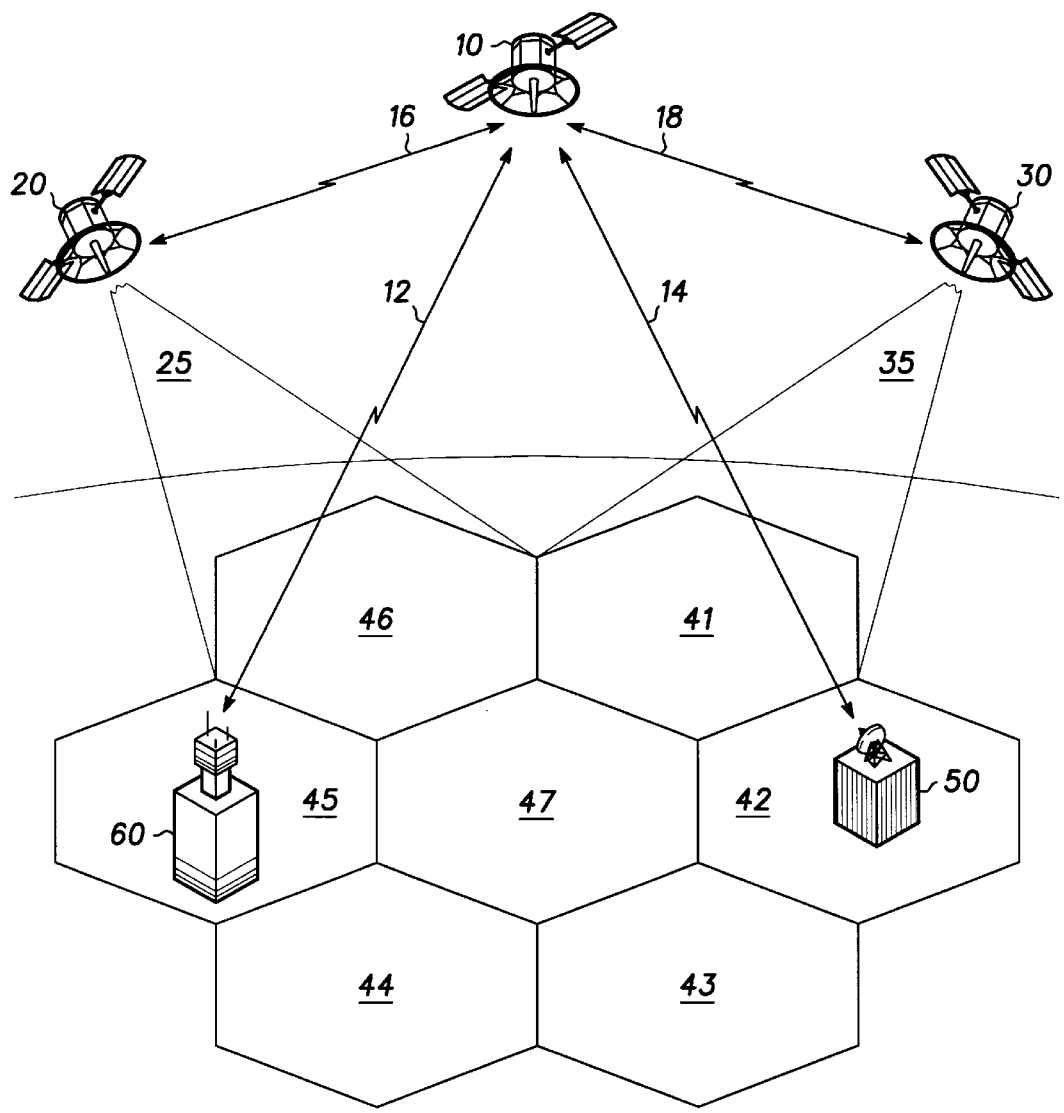
FIG. 1 shows a satellite communications system in accordance with a preferred embodiment of the present invention.

FIG. 1 shows a satellite communications system in accordance with a preferred embodiment of the present invention. FIG. 1 includes geosynchronous satellite 10, non-geosynchronous satellites 20 and 30, operations center 60, and ground terminal 50. Geosynchronous satellite 10 resides at an altitude that results in an orbital period of 24 hours. As a result, satellite 10 appears stationary relative to a fixed point on the surface of the Earth. In contrast, non-geosynchronous satellites 20 and 30 reside in orbital planes either above or below that of geosynchronous satellite 10, resulting in orbital periods of greater than or less than 24 hours.

In a preferred embodiment, non-geosynchronous satellites 20 and 30 are low Earth orbit (LEO) satellites with an orbital period of approximately 90 minutes. Each of satellites 20 and 30 may operate alone, but are preferably part of a constellation of LEO satellites. For convenience of description, the operation of non-geosynchronous satellites 20 and 30 is described herein with reference to non-geosynchronous satellite 20 alone, however one skilled in the art will appreciate that the description of non-geosynchronous satellite 20 can apply to other non-geosynchronous satellites in a constellation.

Non-geosynchronous satellite 20 communicates with ground terminals by projecting antenna beams into "cells" on the ground. Non-geosynchronous satellite 20 preferably time and frequency multiplexes communications between multiple beams to save power. In a preferred embodiment, non-geosynchronous satellite 20 time and frequency multiplexes communications between seven beams, creating seven cells on the surface of the earth, shown in FIG. 1 as cells 41 through 47. For the purposes of describing the present invention, the configuration of these seven cells is termed "the seven cell reuse pattern." Exemplary cells 41–47 are shown as hexagons in FIG. 1, but this is for convenience of illustration only, and other shapes are, of course, possible. In addition, more or less that seven cells is possible in a reuse pattern.

As non-geosynchronous satellite 20 travels relative to the surface of the Earth, it preferably time multiplexes its services across the seven cells so that ground terminal 50 is in contact with the satellite for one-seventh of the time. As is discussed in more detail below, this one-seventh duty cycle can create a challenge for ground terminal 50 to track non-geosynchronous satellite 20.

Ground terminal 50 is preferably a terminal mounted on or near a building occupied by a user. Examples include, but are not limited to, a home, a commercial office building, or a tower. Ground terminal 50 includes at least one antenna capable of tracking non-geosynchronous satellites as they move relative to the Earth's surface. The ground terminal antennas can be steered either mechanically or electrically. In the case of a mechanically steerable antenna, a gimbal and associated gimbal motor is employed, and in the case of an electrically steerable antenna, a phased array antenna is typically employed. A preferred embodiment of the present invention contemplates the inclusion of two separate but complementary methods of tracking satellites. These methods are: 1) automatic tracking, and 2) computed tracking.

Automatic Tracking

Automatic tracking uses received power from a satellite to fine-tune the orientation of a ground terminal antenna beam that transmits signals to, and receives signals from, non-geosynchronous satellites. When a satellite transmits a continuous signal, automatic tracking is convenient because a feedback system within the ground terminal can continuously be employed to reliably orient the antenna. In a preferred embodiment of the present invention, however, ground terminal 50 only receives a signal from non-geosynchronous satellite 20 with a duty cycle of one-seventh, due to the seven cell reuse pattern. This means that ground terminal 50 observes a signal for a period of time, then does not observe the signal for approximately six times as long. These conditions are less than ideal for the use of automatic tracking alone.

Computed Tracking

When using computed tracking, ground terminal 50 begins with ephemeris data describing the orbit of a satellite. Ephemeris data, such as two line ephemeris data, is well known in the art. Ground terminal 50 starts with ephemeris data and continually computes, or "propagates," the current position of the satellite. A propagator can be implemented in software on a suitable processor, in hardware, or in a combination of the two.

Computed tracking is advantageous in part because no overhead demands are placed on the satellite being tracked. For example, communication resources of a non-geosynchronous satellite are not dedicated for the purpose of tracking. Unfortunately, orbits degrade and are sometimes modified. When this occurs, the propagator within ground terminal 50 will compute an incorrect location for a satellite, and possibly cause a communication link to be broken, resulting in loss of service. Accordingly, it can be seen that it is advantageous for ground terminal 50 to receive up-to-date, or "fresh," ephemeris data on a regular basis.

One possible method of updating ground terminal 50 with fresh ephemeris data is to have non-geosynchronous satellite 20 broadcast fresh ephemeris data either continuously or periodically. Unfortunately this would require the use of communications channels that otherwise would be used to provide service. In addition, ground terminal 50 would still have to acquire signals from non-geosynchronous satellites prior to receiving fresh ephemeris data.

The method and apparatus of the present invention provides for updating ephemeris data at ground terminal 50 without consuming communications resources of non-geosynchronous satellites 20 and 30. Ground terminal 50 communicates with geosynchronous satellite 10 via communications link 14. Any type of communications can exist on communications link 14, but communications link 14 is preferably limited to time insensitive transmissions, such as broadcast data or broadcast video. Communications link 14 is also suitable for broadcasting fresh ephemeris data for non-geosynchronous satellites 20 and 30. In a preferred embodiment, communications satellites 20 and 30 compute their own ephemeris data by receiving Global Positioning System (GPS) signals, and then transmit the ephemeris data to geosynchronous satellite 10 via communications links 16 and 18. GPS systems, signals, and receivers are well known in the art.

In an alternate embodiment, ground station 60 tracks non-geosynchronous satellites as they pass overhead, and transmits fresh ephemeris data to geosynchronous satellite 10 via communications link 12. In both embodiments just described, geosynchronous satellite 10 includes fresh ephemeris data for non-geosynchronous satellites. This fresh ephemeris data is then broadcast on communications link 14 to be used by ground terminal 50 in acquiring and tracking non-geosynchronous satellites 20 and 30.

Transmitting fresh ephemeris data from a geosynchronous satellite to a ground terminal is advantageous in part because when ground terminal 50 is turned on, it need not search the sky for non-geosynchronous satellite signals. Instead, it can point an antenna to a fixed location in the sky, receive fresh ephemeris data from a geosynchronous satellite, and then proceed to establish communications links with non-geosynchronous satellites in a rapid manner.

A preferred embodiment of the present invention utilizes both automatic tracking and computed tracking. Ground terminal 50 receives fresh ephemeris from geosynchronous satellite 10, quickly acquires a non-geosynchronous satellite using computed tracking, and then fine-tunes using automatic tracking.

Hand-Off

As non-geosynchronous satellites travel relative to the surface of the Earth, ground terminals communicate with a succession of satellites so uninterrupted communications can take place. Take for example the case where non-geosynchronous satellite 30 is traveling out of range of ground terminal 50, and non-geosynchronous satellite 20 is coming within range of ground terminal 50. As non-geosynchronous satellite 30 is servicing the seven cells 41 through 47, ground terminal 50 communicates with non-geosynchronous satellite 30 via beam 35. As non-geosynchronous satellite 30 travels out of range, and non-geosynchronous satellite 20 comes within range, ground terminal 50 transitions from using non-geosynchronous satellite 30 to using non-geosynchronous satellite 20. This is commonly referred to as "hand-off." It is desirable for the hand-off to occur quickly and without loss of data. This can be achieved by ground terminal 50 acquiring non-geosynchronous satellite 20 quickly and reliably upon handing-off communications.

The method and apparatus of the present invention provide for a quick and reliable hand-off in part because ground terminal 50 receives fresh ephemeris data from geosynchronous satellite 10, and computes the location of non-geosynchronous satellite 20 with a propagator. This can be accomplished while still in communications with non-geosynchronous satellite 30. Upon the moment of hand-off, ground terminal 50 can re-orient its antenna beam and quickly acquire signals from non-geosynchronous satellite 20. Alternatively, when ground terminal 50 employs an antenna having multiple beams, a first beam can communicate with non-geosynchronous satellite 10 while a second beam acquires non-geosynchronous satellite 20. This is especially advantageous in a system such as the exemplary system shown in FIG. 1, where non-geosynchronous satellites employ a seven cell reuse pattern, and communicate with each cell at a duty cycle less than 100 percent. Ground terminal 50 can orient its antenna beam to non-geosynchronous satellite 20 even when a signal from the satellite is not present in cell 42.

Ground terminal can also have more than one antenna. When more than one antenna is used, the second antenna can be oriented towards non-geosynchronous satellite 20 while the first antenna is still communicating with non-geosynchronous satellite 30. The use of multiple antennas is advantageous in part because it allows ground terminal 50 to establish "make before break" connections.

Provisioning

"Provisioning" as used herein means the process of programming a ground terminal with information that will be used after the ground terminal is turned on and before it becomes operational.

The method and apparatus of the present invention is also advantageously utilized when ground terminal 50 is initially installed. Without a reliable means of gathering fresh ephemeris data, ground terminal 50 will search the sky for a non-geosynchronous satellite signal prior to commencing communications. The time required for this search can vary greatly as a function of many parameters, and the time is preferably kept to a minimum so as not to adversely impact a user. Another possibility for faster acquisition of non-geosynchronous satellites without the use of geosynchronous satellite 10, is to provision ground terminal 50 at the factory with ephemeris data describing the constellation of satellites which is of interest. Unfortunately, this does not completely alleviate the search problem because the ephemeris data, as previously described, can age and become inaccurate.

The method and apparatus of the present invention is advantageously used each time a user commences service using ground terminal 50. If ground terminal 50 is not in use for a significant period of time, that is, a time period long enough for ephemeris data to age, then when a user turns ground terminal 50 on, ground terminal 50 must re-acquire a non-geosynchronous satellite. If a time consuming search is necessary, the result is time spent by the system that otherwise could be spent providing services and generating revenue. The method and apparatus of the present invention provides a quick and reliable method for acquiring a non-geosynchronous satellite in part because geosynchronous satellite 10 can continuously broadcast fresh ephemeris data to ground terminal 50 via communications link 14 even when ground terminal 50 is turned off. When ground terminal 50 is turned on, the fresh ephemeris data can be received immediately, and a non-geosynchronous satellite can be quickly acquired. This results in a user's perception that a constant and reliable communications link exists.

Inter-Operation with Competing Systems

The embodiments described thus far assume that non-geosynchronous satellites 20 and 30 are part of the same constellation. In an alternate embodiment, non-geosynchronous satellites 20 and 30 are not part of the same constellation. For exemplary purposes in describing this alternate embodiment, non-geosynchronous satellite 20 is assumed to be part of the constellation with which ground terminal 50 is designed to inter-operate; and non-geosynchronous satellite 30 is a satellite from a different constellation that ground terminal 50 is capable of interfering with. In this alternate embodiment, it is desirable for ground terminal 50 to cooperatively communicate with non-geosynchronous satellite 20 and to cooperatively avoid interference with non-geosynchronous satellite 30. The method and apparatus of the present invention provide an advantageous means for ground terminal 50 to avoid interference with competing non-geosynchronous satellite 30 while communicating with cooperative non-geosynchronous satellite 20, and providing services to a user.

In this alternate embodiment, geosynchronous satellite 10 has ephemeris data for cooperative non-geosynchronous satellite 20, as well as for competing non-geosynchronous satellite 30. Geosynchronous satellite 10 receives fresh ephemeris data for non-geosynchronous satellite 20 through means previously described. Geosynchronous satellite 10 can receive fresh ephemeris data for a competing non-geosynchronous satellite 30 via link 18 as previously described, or through other means. These other means may include receipt from a cooperating ground station, such as ground station 60, or from a public source such as the North American Air Defense Command (NORAD). When ground terminal 50 is communicating with non-geosynchronous satellite 20, and ephemeris data describing the orbit of non-geosynchronous satellite 30 allows ground terminal 50 to determine that interference is imminent, ground terminal 50 may cease transmitting, or hand-off to another cooperative non-geosynchronous satellite.

Figure 2:
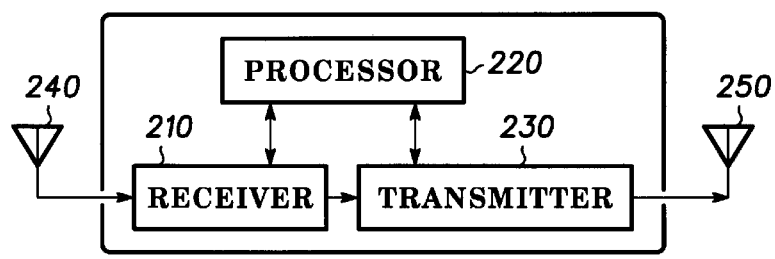
FIG. 2 shows a diagram of a geosynchronous satellite in accordance with a preferred embodiment of the present invention.

Turning now to FIG. 2, FIG. 2 shows a diagram of a geosynchronous satellite in accordance with a preferred embodiment of the present invention. Geosynchronous satellite 200 includes receiver 210, processor 220, transmitter 230, and antennas 240 and 250. Receiver 210 receives ephemeris data from signals received by antenna 240. Ephemeris data is then output by receiver 210 and received by transmitter 230 for re-transmission from geosynchronous satellite 200 via antenna 250. Antennas 240 and 250 are shown as separate antennas in FIG. 2, but one skilled in the art will appreciate that they could be combined into one while still practicing the present invention.

Ephemeris data received by receiver 210 can also be retrieved by processor 220. Processor 220 can modify the format of the ephemeris data prior to sending it to transmitter 230 for transmission. Additionally, receiver 210 may receive position data from non-geosynchronous satellites as computed from GPS signals. Processor 220 is then utilized to compute ephemeris data from the location data received by receiver 210. Processor 220 can then send ephemeris data to ground terminals via transmitter 230 and antenna 250.

Figure 3:
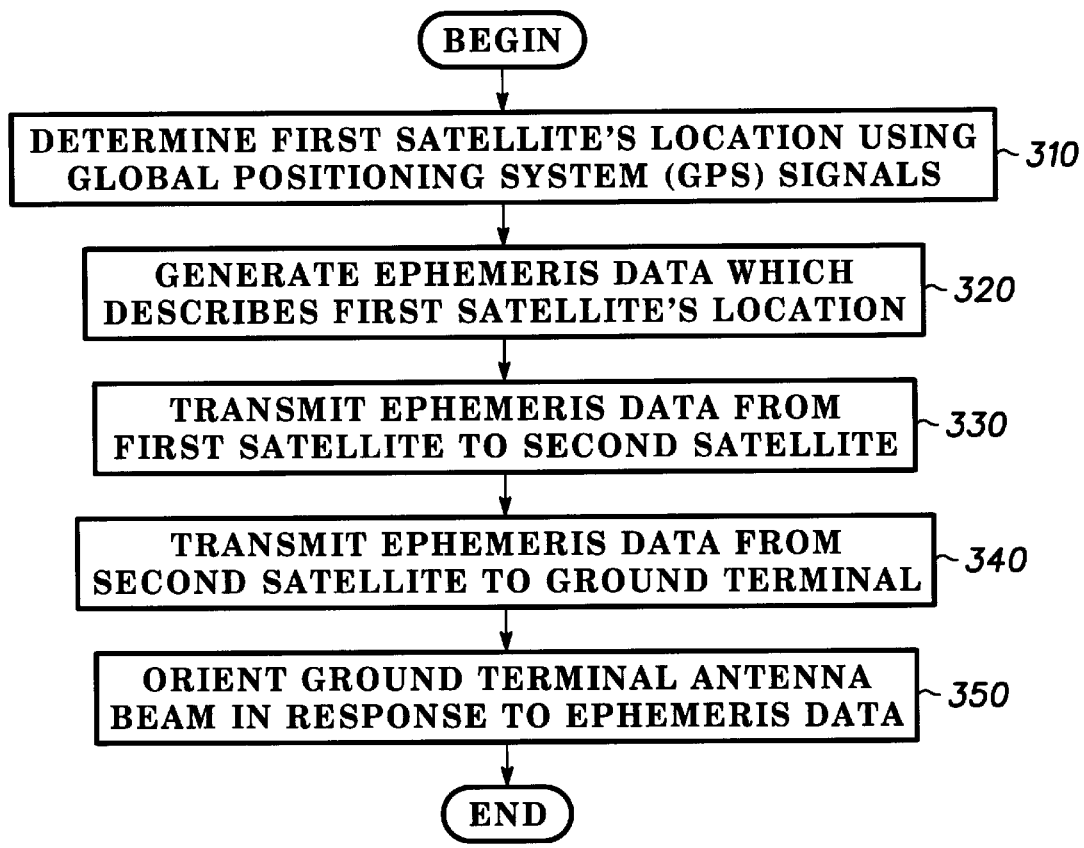
FIG. 3 shows a flowchart of a method for acquiring and tracking the location of a satellite in accordance with a preferred method of the present invention.

FIG. 3 shows a flowchart of a method for tracking the location of a satellite in accordance with a preferred embodiment of the present invention. Method 300 begins with step 310 when a first satellite's location is determined using GPS signals. In a preferred embodiment, this satellite is a non-geosynchronous satellite equipped with a GPS receiver capable of computing the satellite's position. Of course, this step can be skipped if other methods of computing location are employed. In step 320, ephemeris data is generated which describes the first satellite's location. This ephemeris data is preferably generated by the satellite which computed its position. In step 330, the ephemeris data generated in step 320 is transmitted from the first satellite to a second satellite. The second satellite of step 330 is preferably a geosynchronous satellite that is easily found by a ground terminal.

The embodiment described thus far in method 300 provides for ephemeris data to be generated in the first satellite. In an alternate embodiment, the first satellite sends location information to the second satellite, which then computes ephemeris data. In step 340, the ephemeris data is transmitted from the second satellite to a ground terminal. Then, in response to the ephemeris data, the ground terminal orients an antenna in step 350. Method 300 is advantageous in part because the ground terminal can orient its antenna to receive signals from a first satellite after having received ephemeris data from a second satellite. When the second satellite is a geosynchronous satellite, and the first satellite is a non-geosynchronous satellite, method 300 provides a quick and reliable method for acquiring signals from a non-geosynchronous satellite.

Figure 4:
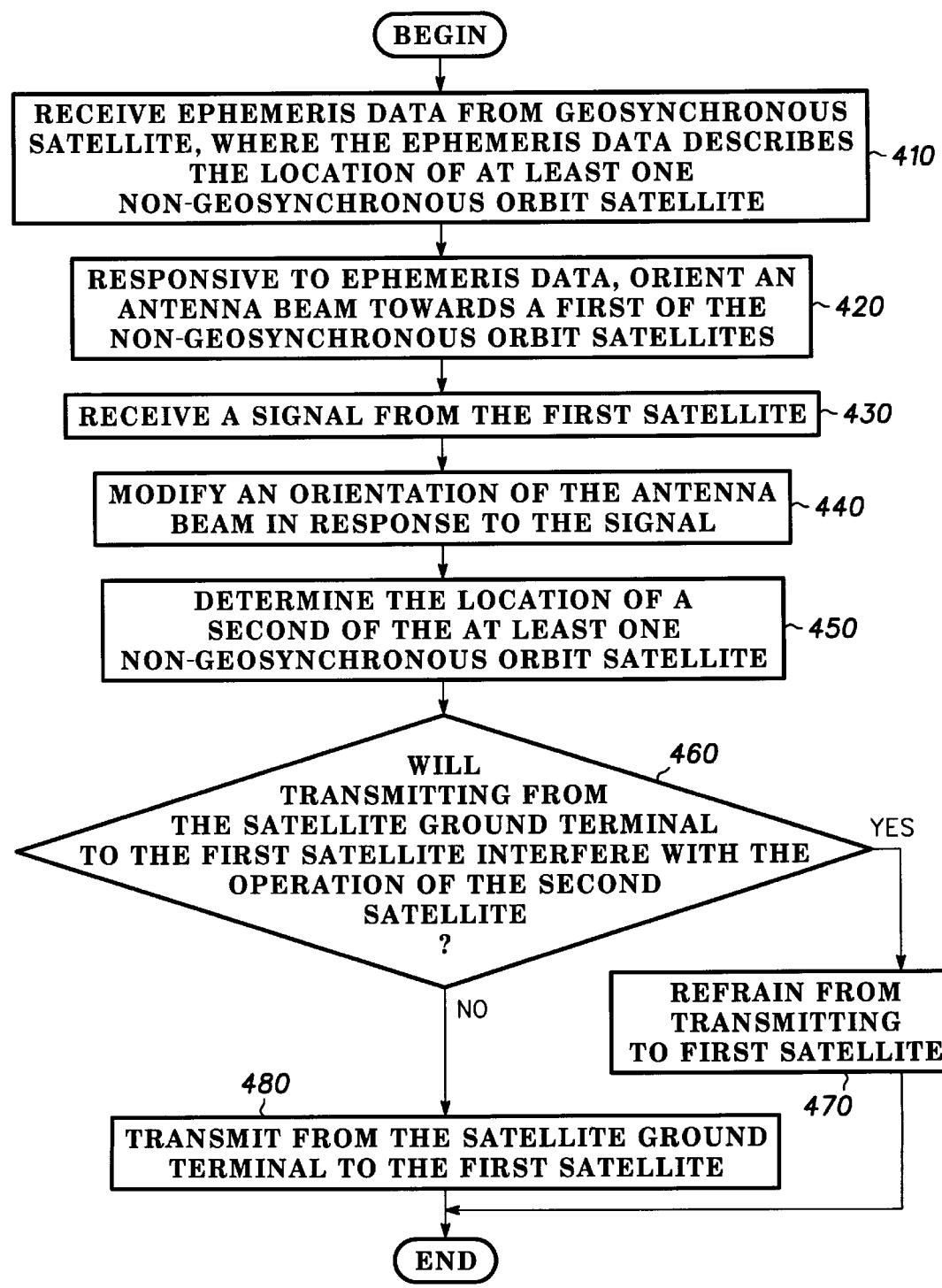
FIG. 4 shows a flowchart of a method for controlling a ground terminal in accordance with a preferred embodiment of the present invention.

FIG. 4 shows a flowchart of a method for controlling a ground terminal in accordance with a preferred embodiment of the present invention. Method 400 begins with step 410 when ephemeris data is received from a geosynchronous satellite, where the ephemeris data describes the location of at least one non-geosynchronous satellite. In step 420, the ground terminal orients an antenna toward one of the non-geosynchronous satellites described in step 410. Prior to orienting the antenna, the ground terminal can propagate the ephemeris data, thereby generating a current location for the non-geosynchronous satellite. Then in step 430, the ground terminal receives a signal from the non-geosynchronous satellite. Then through automatic tracking, the ground terminal can modify an orientation of the antenna beam in response to the signal received in step 430. This modification occurs in step 440. Then in step 450, the ground terminal determines the location of a second non-geosynchronous satellite described in step 410. This second non-geosynchronous orbit satellite is a satellite that the ground terminal desires not to interfere with. In step 460, a determination is made whether transmitting from the ground terminal will interfere with the operation of the second satellite. If interference will occur, processing proceeds to step 470 where the ground terminal refrains from transmitting to the first satellite. Otherwise, if transmitting from the satellite ground terminal does not interfere with the second satellite, processing branches to step 480 where the ground terminal transmits to the first satellite.

Method 400 of FIG. 4 provides an advantageous method for controlling a ground terminal. This advantageous method allows a ground terminal to cooperatively communicate with a first non-geosynchronous satellite, and to not interfere with a competing non-geosynchronous orbit satellite, through the use of ephemeris data received from a geosynchronous satellite.

Figure 5:
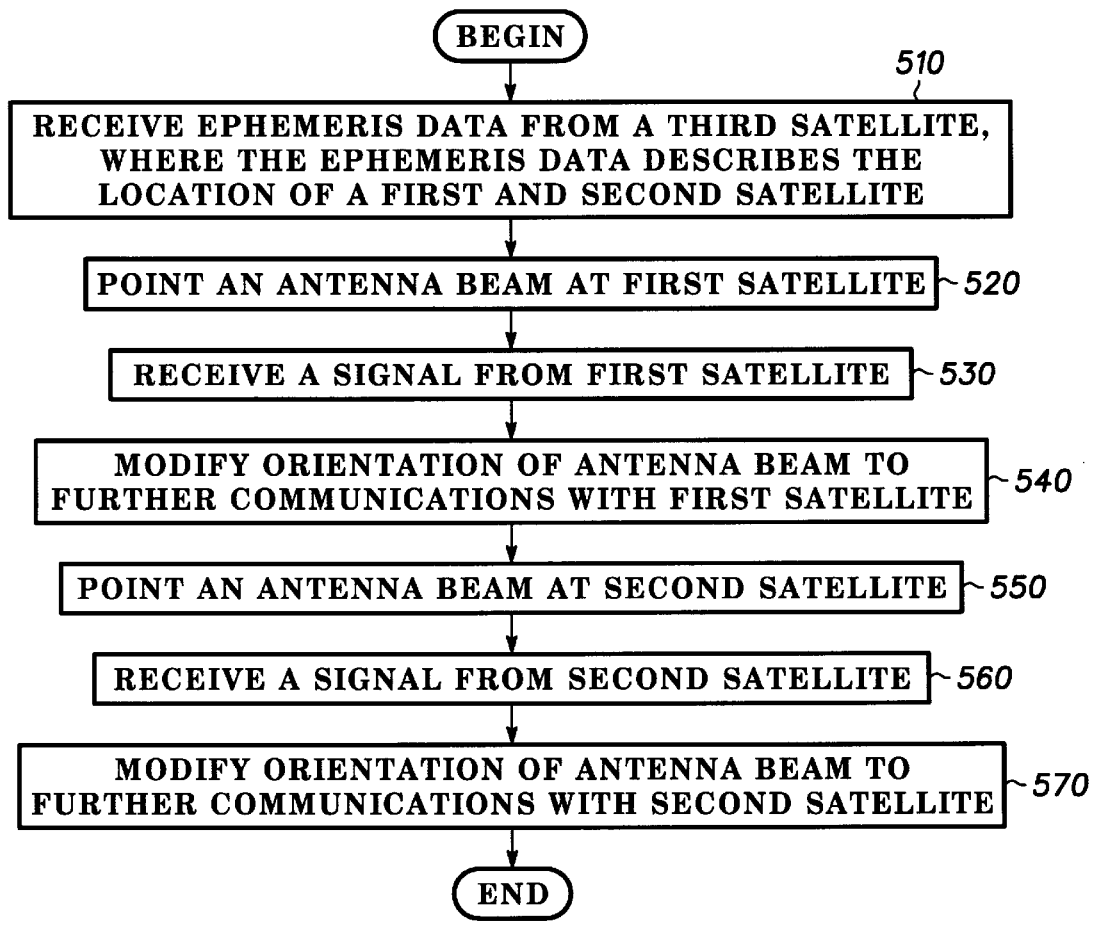
FIG. 5 shows a flowchart of a method for handing-off communications from a first satellite to a second satellite in accordance with a preferred embodiment of the present invention.

FIG. 5 shows a flowchart of a method for handing-off communications from a first satellite to a second satellite in accordance with a preferred embodiment of the present invention. Method 500 begins with step 510 when ephemeris data describing the location of a first and a second satellite is received by a ground terminal from a third satellite. Then in step 520, the ground terminal points an antenna at the first satellite. In step 530, the ground terminal receives a signal from the first satellite and modifies the orientation of the antenna beam to further communications with the first satellite in step 540. Then, in step 550, the ground terminal points the antenna at the second satellite, and receives a signal from the second satellite in step 560. Then in step 570, the ground terminal modifies the orientation of the antenna beam to further communications with the second satellite. Although method 500 has been described with respect to a ground terminal with a single antenna, method 500 is equally applicable to ground terminals with multiple antennas.

In summary, the method and apparatus of the present invention as described provides an efficient means of tracking non-geosynchronous satellites. At least one geosynchronous satellite is employed to transmit ephemeris to a ground terminal, thereby allowing the ground terminal to quickly determine the location of a non-geosynchronous satellite, and reliably acquire the non-geosynchronous satellite signal.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments. For example, a ground terminal can have multiple antennas for tracking multiple satellites simultaneously.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of tracking a location of a first satellite, said method comprising the steps of:

transmitting ephemeris data from said first satellite to a second satellite, wherein said ephemeris data describes said location of said first satellite;

said second satellite transmitting said ephemeris data to a ground terminal, wherein said second satellite is in a geosynchronous orbit; and responsive to said ephemeris data, said ground terminal orienting an antenna beam such that said first satellite may be tracked.

2. The method of claim 1 further including the step of:

prior to transmitting said ephemeris data from said first satellite to said second satellite, said first satellite determining said location using Global Positioning System (GPS) signals; and generating said ephemeris data.

3. The method of claim 1 wherein said first satellite is in a non-geosynchronous orbit.

4. A method of tracking a location of a first satellite, said method comprising the steps of:

transmitting ephemeris data from a first satellite to a second satellite, wherein said ephemeris data describes said location of said first satellite;

said second satellite transmitting said ephemeris data to a ground terminal, wherein said second satellite is in a geosynchronous orbit; and orienting an antenna beam of said ground station in response to said ephemeris data such that said first satellite may be tracked.

5. The method of claim 4 wherein said first satellite is in a non-geosynchronous orbit.

* * * * *